May 1, 1956     D. D. MAXSON     2,743,799

SELECTIVELY REVERSIBLE AND IRREVERSIBLE CONTROL MECHANISMS

Filed Oct. 16, 1951     3 Sheets-Sheet 1

INVENTOR

Donald D. Maxson

BY *Raphael [signature]*

ATTORNEY

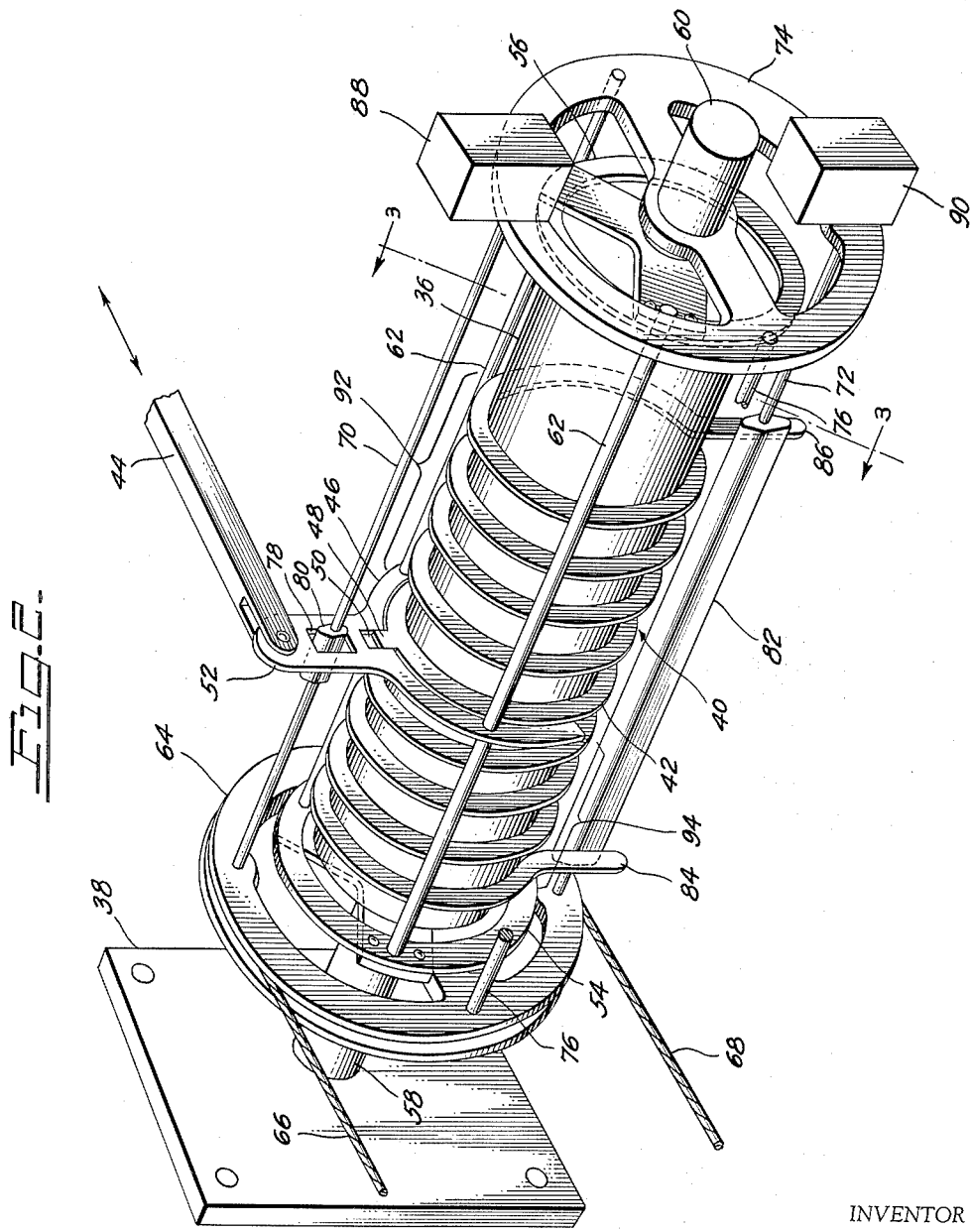

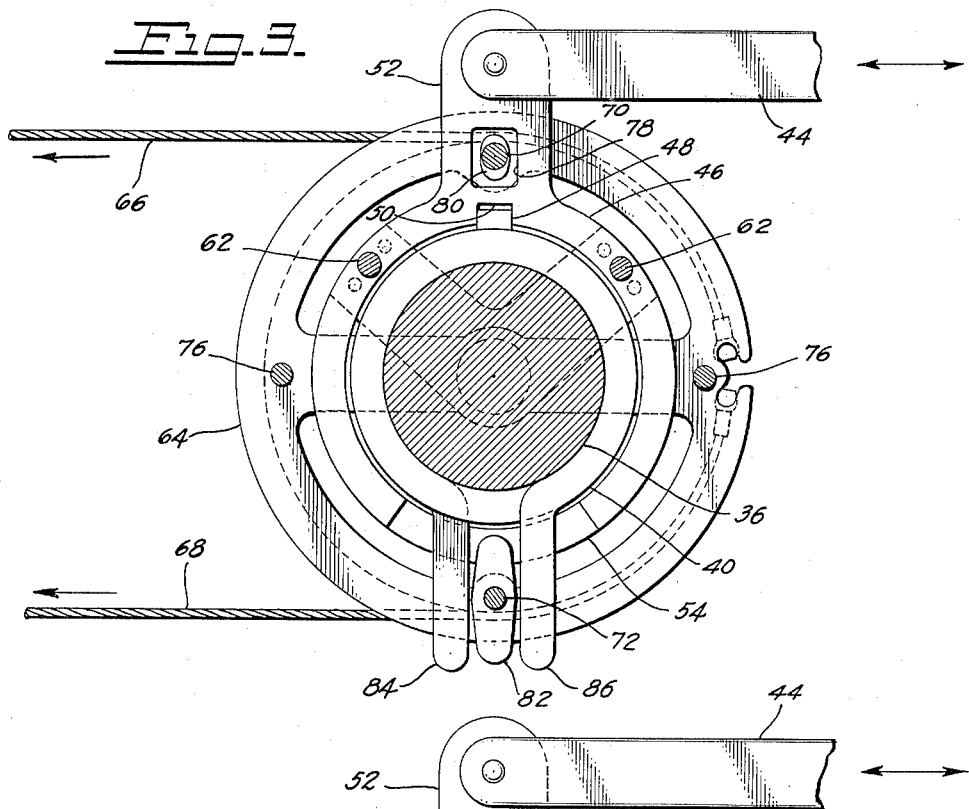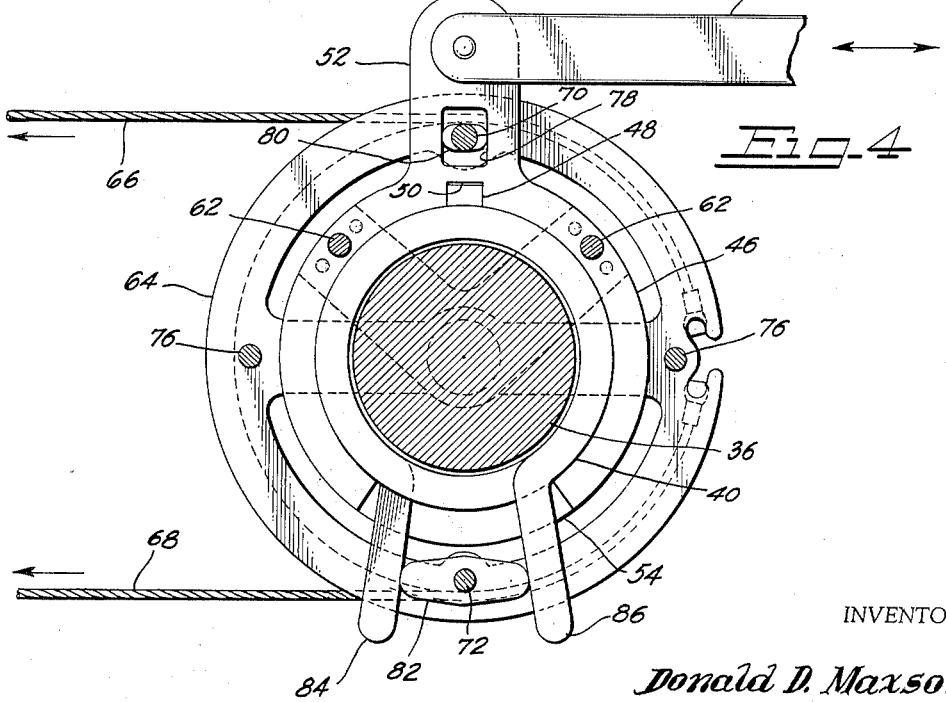

United States Patent Office 2,743,799
Patented May 1, 1956

2,743,799

SELECTIVELY REVERSIBLE AND IRREVERSIBLE CONTROL MECHANISMS

Donald D. Maxson, Trenton, N. J., assignor to Chase Aircraft Company, Inc., West Trenton, N. J., a corporation of New York Application October 16, 1951, Serial No. 251,600

10 Claims. (Cl. 192—8)

This invention relates to selectively reversible and irreversible control mechanisms, and more particularly to a control system for aircraft flight control surfaces.

It is normal practice to lock aircraft flight control surfaces while aircraft are on the ground in order to prevent gust damage thereto. Manually applied external clamps, which secure control surfaces to adjacent fixed surfaces, are the conventional locking method. A large number of such clamps are necessary for most aircraft, however, let alone the work involved in their application. Additionally, there is the possibility of inadvertently failing to remove such a clamp prior to take-off. Controls thus locked are disastrous when an aircraft is airborne.

In order to avoid the disadvantages of externally applied clamps several expedients have been developed. One involves pilot-operable locks for the control system. Another involves the use of irreversible mechanisms in the control system. The former expedient is always susceptible of human error, i. e. forgetting to unlock prior to take-off, while the latter expedient results in a loss of "feel." "Feel," which may be defined as the reaction force on the pilot's control column resulting from external loads on the flight control surfaces, is considered essential for accurate manually-controlled flight.

Hence, it is an object of this invention to provide a selectively reversible and irreversible mechanism for a control system.

It is another object of this invention to provide a selectively irreversible and reversible mechanism, operable by the pilot, for preventing movements of aircraft flight control surfaces by external loads or permitting such movement and transmission of the reaction forces to the pilot's control column.

It is still another object of this invention to provide a selectively operable lock for aircraft flight control surfaces which will prevent movement thereof by external loads yet permit movement by the pilot.

It is a further object of this invention to provide a selectively reversible and irreversible control mechanism that is simple in design, with consequent economy in manufacture, yet effective in operation.

Other objects and advantages of this invention will be evident from the following description and accompanying drawing, in which:

Figure 2 is a perspective view illustrating, somewhat diagrammatically, a selectively reversible and irreversible mechanism embodying this invention. The mechanism is shown in irreversible condition.

Figure 3 is a sectional view taken on line 3—3 of Figure 2.

Figure 4 is a view corresponding to Figure 3 but showing the mechanism in reversible condition.

Figure 1:
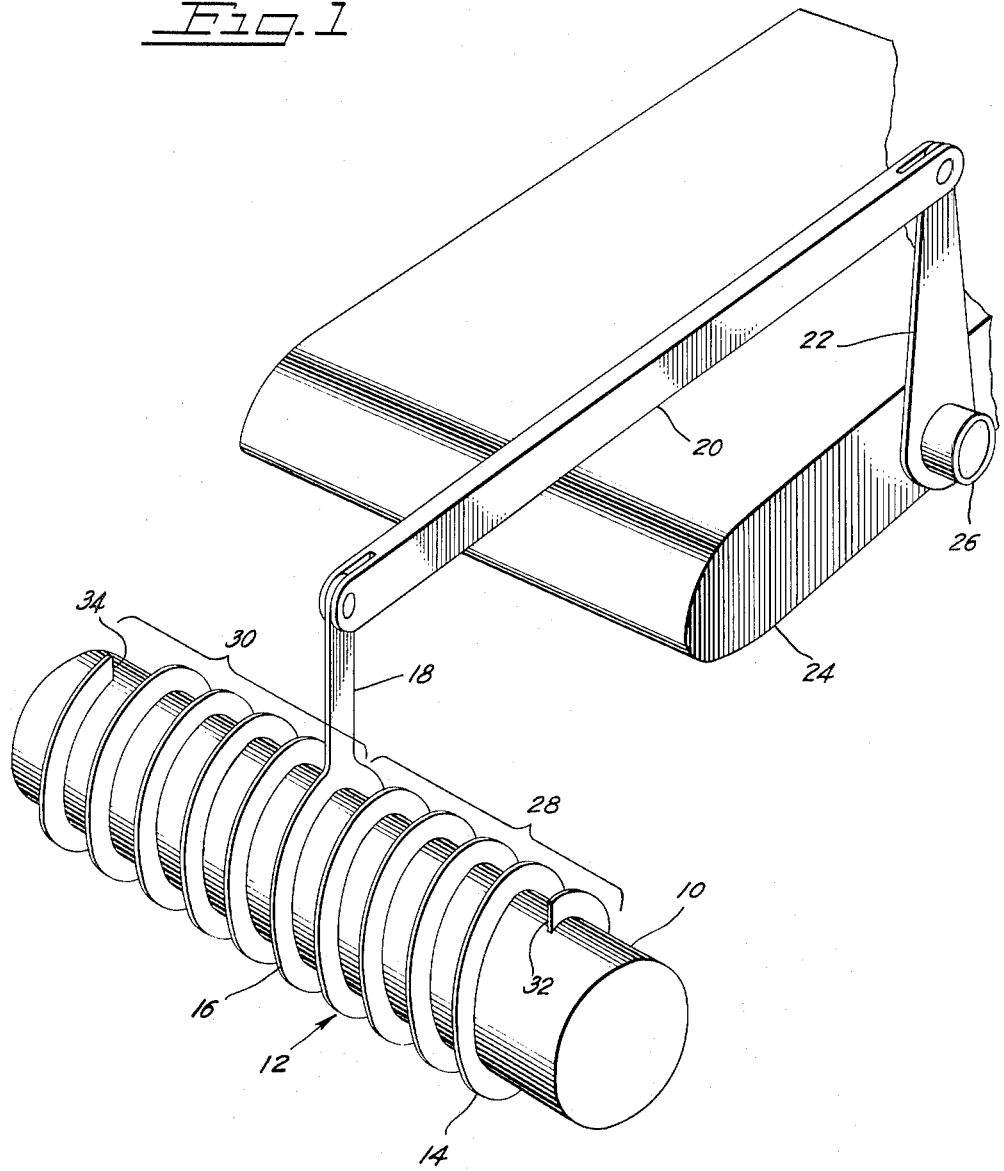
Figure 1 is a perspective view diagrammatically illustrating the locking principle embodied in this invention.

Although this invention is described with reference to aircraft flight control systems, it will be understood that the invention is applicable to other mechanical control systems.

Referring now to the drawings, Figure 1 diagrammatically illustrates the principle of operation of the locking mechanism of this invention. A fixed drum 10, which may be secured to any convenient part of the frame structure of an aircraft (not shown), has a helical coil 12 tightly wound thereon. The inner diameter of the coil 12, when relaxed, is slightly less than the outside diameter of the drum 10; the member 14 forming the coil 12, is preferably, for structural strength, rectangular in cross section and axially flat, i. e. of greater radial than axial dimension, as shown. The intermediate or center turn or convolution 16 of the coil 12 is provided with a radial arm 18 that is connected by a link 20 to a crank arm 22 which operates an aircraft flight control surface 24, mounted for pivotal movement by the shaft 26.

From the structure shown, it will be seen that external loads on the surface 24 urging it to pivot clockwise, and effecting tension (a tensile load) on the link 20, tend to wind the several convolutions of the section 28 of the coil 12 more tightly about the drum 10. Such hugging action constitutes an effective brake or lock to resist or prevent movement of the surface 24. Likewise, counterclockwise movement of the surface 24 by external loads is resisted or prevented by the hugging action of the convolutions of the section 30 of the coil 12.

The mechanical advantages of a coil brake may be expressed as follows:

$$\frac{\text{input load}}{\text{required reaction}} = \text{antilog} \, (.8686 \times \text{coef. of friction} \times \pi \times \text{number of effective coils})$$

Hence, it can be seen that a small coil brake will serve effectively to lock an aircraft flight control surface against large external loads, or such coil can be modified to provide any desired degree of braking action.

Referring again to Figure 1 it will be seen that the locking action of either of the sections 28 or 30 of the coil 12 may be relaxed by applying an unwinding force to the free end thereof, i. e. to the end 32 or the end 34, respectively. This principle is utilized to provide the selectively reversible or irreversible mechanism shown in Figures 2, 3 and 4. The mechanism comprises a drum 36 having a mounting plate 38 secured, as by welding, to one end thereof. Tightly wound on the drum 36 is a helical locking coil 40 similar to the coil 12, previously illustrated in Figure 1. For practical reasons the center convolution 42 of the coil 40 is connected to a control surface link 44 by means of a segmental "take-off" element 46 that is splined, by a tongue 48 and groove 50 connection, to the center convolution 42 and has a radial arm 52 pivotally connected to the link 44. The element 46 is mounted for oscillation about the drum 36 by a cage-like assembly consisting of two spaced bearing members 54 and 56 mounted for rotation on reduced end portions 58 and 60, respectively, of the drum and having longitudinal connecting ribs 62 which carry the element 46.

Rotatably mounted on the reduced drum portion 58 outside of the bearing member 54 is a control sector 64 having conventional control cables 66 and 68, operable by the pilot's column (not shown), connected thereto. Journalled in the control sector 64 adjacent the periphery thereof, and extending laterally therefrom outside of the cage-like assembly, are two diametrically opposite shafts 70 and 72 having their other ends journalled in a supporting sector or wheel 74 rotatably mounted on the other reduced end portion 60 of the drum outside of the bearing element 56. Longitudinal bars 76 connect the sectors 64 and 74 for rotation as a unit. The shaft 70 passes through an aperture 78 in the arm 52 of the element 46 and carries a cam 80 disposed within the aperture 78 and elongated in cross section. Clearance exists between the cam 80 and the sides of the aperture 78 when the cam is in the angular position shown in Figures 2 and 3. The other shaft 72 carries a cam 82, elongated both longitudinally and in cross section, and disposed to alternately engage radial arms or extensions 84 and 86 of the free ends of the coil 40.

The shafts 70 and 72 are rotatable through 90° by any suitable means: manual, mechanical or electric. For convenience, however, it is preferred to rotate the shafts 70 and 72 by electric actuators or motors 88 and 90, respectively, mounted on the supporting sector 74 and operable in unison by a remote control switch (not shown).

When the cams 80 and 82 are in the position shown in Figures 2 and 3, the braking or locking action of the coil 40 is effective to preclude movement of a control surface, connected to the link 44, by external loads. Movement of such surface by the control cables 66 and 68 is possible, however, because of the cams 80 and 82. As is seen in Figure 3, if the cable 66 be pulled then, on the initial movement of the control sector 64, the cam 82 engages the radial arm 86 on the free end of the coil 40 and exerts an unwinding force thereon which renders the locking action of the coil section 92 ineffective. Thereafter, the cam 80 engages the side of the aperture 78 in the take-off element 46 and subsequently rotates the latter, as well as the coil 40, to move the control surface. Such movement is only hindered by the slight dragging action of the section 94 of the coil. If the cable 68 is pulled, the control surface is likewise moved in the opposite direction, with the unlocking cam 82 first relieving the locking action of the coil section 94 and the actuating cam 80 subsequently engaging the other side of the aperture 78 in the take-off element 46 to rotate the latter.

Thus, it will be seen that when the cams 80 and 82 are in the position shown in Figures 2 and 3, the mechanism is irreversible, i. e. the control surface can be moved only by the pilot, and not by external loads.

Referring now to Figure 4, it will be seen that when the cams 80 and 82 are rotated through 90° by the actuators 88 and 90, the locking action of both coil sections 92 and 94 is relieved because of the unwinding movement imparted to their free ends i. e. to the arms 86 and 84, respectively, by the unlocking cam 82. Simultaneously, the clearance between the sides of the aperture 98 in the take-off element 46 and the cam 80 is eliminated. Hence, the take-off element 46 may be moved directly by the control cables 66 and 68, without any lost motion or any hindrance by the coil 40. In the position illustrated in Figure 4, the mechanism is reversible so that the pilot has "feel."

As a practical matter the elevator, rudder, and aileron controls of an aircraft would each be equipped with a separate mechanism embodying the invention, with each mechanism controlled from the pilot's compartment by a separate switch. The advantages of such a system are manifold. The pilot remains in complete control of the flight control surfaces regardless of whether the locks are on or off, thus affording absolute safety. The locks can be rendered effective or ineffective simply by flipping three switches. The locks can also be applied in flight to lock out excessive control loads, or reduce flutter in a control surface.

It will thus be seen that the objects of this invention have been accomplished both fully and effectively. It will be realized, however, that the specific mechanism used to illustrate the invention is susceptible of various changes while retaining the principle of the invention. For example, the actuating cam 80 and the unlocking cam 82 could be mounted on a common shaft, by continuing the free ends of the coil 40 through another 180°, and rotated by a single electric actuator. Hence, this invention includes all modifications encompassed by the spirit and scope of the following claims.

I claim:

1. In a mechanical control system, the combination comprising: a movable surface the position of which is to be regulated and subjected to external loads; constantly operative means for controlling the position of said surface; and means for selectively permitting or preventing transmission of external loads to said controlling means.

2. In a mechanical control system, the combination comprising: a movable control surface subject to external loads; means for moving said surface to adjust its position; and means for selectively preventing or permitting movement of said surface under the effect of external loads while constantly permitting movement of said surface upon operation of said moving means.

3. In a mechanical control system the combination comprising: a movable control surface subject to external loads; means for moving said surface to adjust its position; and means for selectively locking or unlocking the control surface in its adjusted position against movement by external loads while constantly permitting full freedom of further adjustment by said moving means.

4. In a control system having a control element and a member controlled thereby subject to external forces, the combination comprising: an irreversible mechanism connecting the control element to the controlled member and means for selectively rendering said irreversible mechanism inoperative for permitting forces on the controlled member to be directly transmitted to and felt by the control element or operative for preventing transmission of said forces.

5. In a control system having a movably mounted controlled member subject to external loads and a control element for moving the member, the combination comprising: a fixed drum; a helical locking coil tightly wound thereon; linkage means connecting the controlled member to an intermediate point of said coil for transmission of external loads thereto; unlocking means associated with the control element having alternate engagement with the opposite ends of said coil for exerting unwinding forces thereon; a lost motion connection between the control element and said linkage means for controlling the controlled member; and means for selectively eliminating or retaining all lost motion in said lost-motion connection while at the same time respectively conditioning or unconditioning said unlocking means to exert unwinding forces simultaneously on both ends of said coil.

6. The structure defined in claim 5 in which the controlled member is an aircraft flight control surface.

7. The structure defined in claim 5 in which the selective means includes a cam rotatable to eliminate lost motion in the lost-motion connection and cam means rotatable to exert unwinding forces simultaneously on both ends of the coil.

8. The structure defined in claim 5 in which the selective means includes cam means rotatable to eliminate lost motion in the lost motion connection and cam means rotatable to exert unwinding forces simultaneously on both ends of the coil, and including means to rotate all said cam means simultaneously.

9. In a mechanical control system, the combination comprising: a movable control surface subject to external loads; means for moving said surface to adjust its position; and means for selectively locking or unlocking the control surface in its adjusted position against movement by external loads while constantly permitting full freedom of further adjustment by said moving means, said selective means including a fixed drum, a helical locking coil wound tightly about said drum, a link mechanism connecting an intermediate point of said coil to said surface, and means for simultaneously opening both ends of said locking coil away from said drum.

10. In a mechanical control system, the combination comprising: a movable control surface subject to external loads; means for moving said surface to adjust its position; and means for selectively locking or unlocking the control surface in its adjusted position against movement by external loads while constantly permitting full freedom of further adjustment by said moving means, said selective means including means defining a fixed cylindrical surface, a helical locking coil tightly engaged with said cylindrical surface, means connecting an intermediate point of said coil with said control surface, and means for simultaneously moving both ends of said coil away from said cylindrical surface.

References Cited in the file of this patent

UNITED STATES PATENTS

| | | |
|---|---|---|
| 307,663 | Lane | Nov. 4, 1884 |
| 1,043,206 | Custer | Nov. 5, 1912 |
| 1,963,444 | Mullins | June 19, 1934 |
| 2,075,567 | Benedek | Mar. 30, 1937 |
| 2,324,475 | Arens | July 20, 1943 |
| 2,388,699 | Morrill | Nov. 13, 1945 |
| 2,420,552 | Morrill | May 13, 1947 |
| 2,434,480 | Anderson | Jan. 13, 1948 |
| 2,583,828 | Gerstenberger | Jan. 29, 1952 |
| 2,617,506 | Kuntz | Nov. 11, 1952 |

FOREIGN PATENTS

| | | |
|---|---|---|
| 321,851 | Great Britain | Dec. 3, 1928 |